United States Patent [19]

Gangal et al.

[11] 4,370,376

[45] Jan. 25, 1983

[54] TETRAFLUOROETHYLENE POLYMER DISPERSIONS

[75] Inventors: Subhash V. Gangal; Allan H. Olson, both of Parkersburg, W. Va.

[73] Assignee: E. I. Du Pont de Nemours and Company, Wilmington, Del.

[21] Appl. No.: 296,825

[22] Filed: Aug. 27, 1981

Related U.S. Application Data

[63] Continuation of Ser. No. 141,688, Apr. 18, 1980, abandoned.

[30] Foreign Application Priority Data

Apr. 10, 1981 [GB] United Kingdom ............... 8111396

[51] Int. Cl.$^3$ .............................................. B32B 5/16
[52] U.S. Cl. ........................................ 428/241; 55/97; 55/98; 55/524; 55/527; 210/507; 210/509; 427/387; 427/389.8; 428/266; 428/268; 428/273; 428/290

[58] Field of Search ............... 260/29.6 F, 29.6 RW; 427/387, 389.7, 389.8; 428/24 L, 266, 268, 273, 290; 525/100, 104; 65/3.41; 210/509, 510, 507; 55/524, 527, 97, 98

[56] References Cited

U.S. PATENT DOCUMENTS

3,385,812  5/1968  Brachman ...................... 260/29.6 F
3,838,082  1/1974  Sauer ................................ 260/29.6
3,915,916  10/1975  Leverett ......................... 260/29.6 F
4,210,697  4/1980  Adilette ............................... 428/272

OTHER PUBLICATIONS

Derwent Abstract of Japanese Patent Application JA-059,134, filed May 24, 1976.

*Primary Examiner*—Thurman K. Page

[57] ABSTRACT

Tetrafluoroethylene polymer coating dispersions when coated on glass fabric improve acid resistance of the fabric if the dispersions contain a selected silane, siloxane and water repellant.

7 Claims, No Drawings

TETRAFLUOROETHYLENE POLYMER DISPERSIONS

CROSS REFERENCE TO RELATED APPLICATION

This application is a continuation of patent application Ser. No. 141,688, filed Apr. 18, 1980, now abandoned.

FIELD OF THE INVENTION

This invention relates to aqueous dispersions of tetrafluoroethylene polymers and to coatings of such dispersions on glass fabric.

BACKGROUND OF THE INVENTION

Fabric made of glass fiber is useful in filter applications to separate particles from a gas stream. Commonly the glass fabric is coated with a tetrafluoroethylene polymer coating, usually polytetrafluoroethylene (PTFE), to increase the flex life, i.e., resistance to breaking on repeated flexing, of the fabric. Such a coating is especially useful when the glass fabric is employed as a filter bag to filter out particulate solid impurities such as carbon black or fly ash which may be present in flue gases. Due to the passage of hot flue gases through the glass fabric and due to back flushing or pulse flushing during cleaning, the fabric is subjected to flexural stresses which weaken the glass fibers of the fabric and ultimately cause breakage.

While the tetrafluoroethylene polymer coating increases the flex life of the glass fabric, resistance of the coated glass fabric to attack by acids present in hot flue gases could be improved. Many hot flue gases contain oxides of sulfur and water vapor which combine to form an acidic environment. Glass fabric coated with tetrafluoroethylene polymer coatings heretofore were subject to attack by acids in the flue gas which weakened the fabric and shortened the fabric's flex life.

It would be desirable to have a tetrafluoroethylene polymer coating composition which imparts greater resistance to attack by acids than tetrafluoroethylene polymer coating compositions heretofore available.

SUMMARY OF THE INVENTION

It has now been discovered that tetrafluoroethylene polymer coating dispersions which impart resistance to attack by acids to glass fabric coated with the dispersion can be obtained by employing in the coating dispersion, a water-soluble, polyhydrolyzable silane, a fluorinated acrylate water-repellant additive, and a siloxane.

Specifically, the composition of this invention is an aqueous dispersion consisting essentially of
(a) water,
(b) 5–65% by weight tetrafluoroethylene polymer, said weight based on weight of water and polymer, said polymer being of film-forming molecular weight,
(c) 2–60% by weight of a polyhydrolyzable silane of the formula

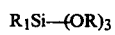

$R_1Si{-}(OR)_3$ wherein R is lower alkyl, preferably alkyl of 1–3 carbon atoms, and $R_1$ is phenyl or substituted lower alkyl, preferably of 1–3 carbon atoms, in which the substituents are selected from halogen, quaternary ammonium, or —NR'R'' in which R' and R'' are each H, lower alkyl, lower alkoxyalkyl, amino lower alkyl, hydroxyl lower alkyl, or substituted (amino lower alkyl), said weight based on weight of tetrafluoroethylene polymer,
(d) 1–20% by weight of a hydrocarbyl siloxane, said weight based on weight of tetrafluoroethylene polymer,
(e) 1–20% by weight of a polymer of a fluorinated ester of an acrylic acid, said weight based on weight of tetrafluoroethylene polymer.

DESCRIPTION OF THE INVENTION

The tetrafluoroethylene polymer in the compositions of this invention can consist of the homopolymer, polytetrafluoroethylene, or can be a copolymer of tetrafluoroethylene with a minor proportion, e.g. up to 35% by weight based on weight of copolymer, of another copolymerizable ethylenically unsaturated monomer. For example, the homopolymer can include small amounts of comonomer modifier, wherein the homopolymer still retains its non-melt fabricable character, such as up to two percent by weight of polymer units derived by copolymerization with tetrafluoroethylene of perfluoroalkyl or oxyperfluoroalkyl trifluoroethylene of 3 to 10 carbon atoms, and preferably hexafluoropropylene, as disclosed in U.S. Pat. No. 3,142,665 to Cardinal, Edens, and Van Dyk or perfluoro(alkyl vinyl ether). Larger amounts of these comonomers or other comonomers render the resultant copolymer melt fabricable. Examples of such copolymers include copolymers of tetrafluoroethylene with such monomers as hexafluoropropylene, as disclosed in U.S. Pat. No. 3,946,763 and Bro and Sandt, higher perfluoroalkenes such as those containing from 4 to 10 carbon atoms, perfluoro(alkyl vinyl ethers) such as perfluoroethyl or perfluoropropyl vinyl ether, disclosed in U.S. Pat. No. 3,132,123 to Harris and McCane, perfluoro-(2-methylene-4-methyl-1,3-dioxolane) disclosed in U.S. Pat. No. 3,308,107 to Selman and Squire, and the highly fluorinated monomers in which a single hydrogen is present which does not change the fluorocarbon character of the copolymer, such monomers being for example 2-hydroperfluoroalkene containing 1 to 3 carbon atoms such as 2-hydropentafluoropropene, the omega hydroperfluoroalkenes containing from 3 to 10 carbon atoms, and the omega-hydroperfluoro(alkyl vinyl ethers) in which the alkyl group contains from 1 to 5 carbon atoms. The tetrafluoroethylene polymers can be of the non-melt-fabricable type, having an extremely high molecular weight, as evidenced by a specific melt viscosity of $1 \times 10^9$ poise or more measured at 380° C. at a shear stress of 6.5 psi or can be of the melt fabricable type having a melt viscosity of from $1 \times 10^3$ to $1 \times 10^6$ poise under the same conditions. Preferably, the polymer is polytetrafluoroethylene.

The polymers are preferably prepared by the aqueous dispersion method for preparing tetrafluoroethylene polymers in which sufficient ionic dispersing agent is present in the polymerization mixture to maintain the polymer particles in dispersion. The tetrafluoroethylene polymer dispersion can be used as prepared or redispersed in water using a suitable dispersing agent. A suitable dispersing agent in an amount of up to about 6% based on polymer may be present.

The water-soluble, polyhydrolyzable silane is preferably one in which $R_1$ is aminoalkyl or substituted amino alkyl. Representative of these amino alkyl groups are —CH$_2$—CH$_2$CH$_2$NH$_2$, —CH- 2—$(CH_2)_2NH(CH_2)_2NH_2$,  —$CH_2$—$(CH_2)_3N(CH_3)_2$, and the like. The term lower alkyl means alkyl of 1–6 carbon atoms, as used herein. Representative silanes include γ-aminopropyl triethoxy silane; (N,N-dimethyl-3-amino propyl trimethoxy silane; N-trimethoxy silyl-propyl-N,N,N-trimethyl ammonium chloride; 3(N-styryl methyl-2-aminoethyl) aminopropyl trimethoxysilane hydrochloride; and the like. Preferably the silane will be present in an amount between 3–12%.

The siloxane is preferably one of the formula

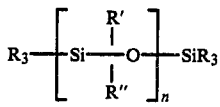

wherein R' and R" are each independently a hydrocarbyl group of 1–20 carbon atoms and one of R' and R" can be hydrogen, n is an integer of between about 5 and 5000, preferably between 10 and 2000 and most preferably between 10 and 100 and R is lower (i.e., 1–4 carbon atoms) alkyl or phenyl, and wherein the polysiloxane can be a homopolymer of a copolymer with another polysiloxane having different hydrocarbyl R' and R" substituents. More preferably R' and R" are each independently alkyl of 1–10 carbon atoms, aryl of 6–10 carbon atoms, alkaryl of 7–11 carbon atoms, or aralkyl of 7–11 carbon atoms. Preferably the siloxane is present in an amount of between 3–12%.

The polymers of a fluorinated ester of acrylic acid used herein are water-repellant additives and are commonly referred to as fluorinated acrylate polymers (including methacrylate). Such polymers include "Zepel" fluorinated water-repellant polymers, and the like. The fluorination of the ester group is generally in the form of a perfluoroalkyl group containing from 3 to 12 carbon atoms. The polymers can be homopolymer or copolymers, including segmented copolymers, with other copolymerizable monomers, with the ester repeat unit which supplies the water repellancy to the polymer being generally represented by the formula

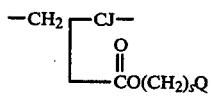

wherein J is H or $CH_3$, s is an integer of 1 to 12, and Q is an organic group which contains a perfluoroalkyl group of 3 to 12 carbon atoms. Examples of monomers from which this repeat unit is derived by polymerization (or copolymerization) are as follows:

$CH_2$=$CHCOOCH_2CH_2(CF_2)_2CF_3$,
$CH_2$=$CHCOOCH_2CH_2(CF_2)_4CF_3$,
$CH_2$=$CHCOOCH_2CH_2(CF_2)_8CF_3$,
$CH_2$=$CHCOO(CH_2)_{11}(CF_2)_7CF_3$,
$CH_2$=$C(CH_3)COOCH_2CH_2N(CH_3)SO_2(CF_2)_7CF_3$,
$CH_2$=$CHCOOCH_2CH_2N)CH_2CH_2CH_3$-)$SO_2(CF_2)_7CF_3$, and
$CH_2$=$C(CH_3)COOCH_2CH_2(CF_2)_5CF_3$.

These water-repellant additives are soluble in some organic solvents and are generally available as an aqueous dispersion which can conveniently be added to the PTFE aqueous dispersion to form a co-dispersion. Preferably the fluorinated acrylate polymer will be present in an amount of between 3–12%.

To prepare the coating dispersions of this invention, the silane, siloxane and fluorinated acrylate polymer are generally added to an aqueous dispersion of the tetrafluoroethylene polymer. Neither temperature nor pressure are critical during the preparation.

The glass fabric to which coating dispersions of the present invention are applied can be made of any glass such as soda-lime-silica, aluminosilicate or borosilicate, but will usually be the glass from which commercially available glass yarn is made. Typically, the glass fabric will have a sizing, such as starch, on the surface thereof. Preferably, however, the glass fabric can be cleaned of sizing such as by conventional heating procedures prior to coating, such as passing a web of glass fabric through an oven heated at about 700° C. in order to burn off the sizing, or batch heating in an oven.

To coat the glass fabric, the coating dispersion is adjusted to a solids content of 5–30% by weight, if necessary, and the fabric is conveniently dipped into the dispersion and then excess liquid is removed by passing through rollers or blades. Alternatively the dispersion can be sprayed on one or both sides of the fabric. The coated fabric is then heated at between 100° and 340° C. to cure and dry the coating. The amount of coating on the cured and dried fabric can be between 3 and 20% by total weight and preferably is between 6 and 15%.

If desired, the coated glass fabric can be topcoated with a dispersion of the water-repellant fluorinated acrylate polymer.

EXAMPLES

"PTFE dispersion" means an aqueous dispersion of polytetrafluoroethylene containing nominally 60% solids and stabilized with octaphenoxy polyethylene oxide dispersing agent having an average of 10 ethylene oxide units and neutralized with ammonium hydroxide.

"Silane" means an γ-aminopropyl triethoxysilane ($H_2NCH_2CH_2CH_2Si[OCH_2CH_3]_3$).

"Siloxane" means 35% methyl phenyl siloxane polymer emulsion.

"Water Repellant" means fluorinated acrylate copolymer dispersion.

"Dispersion A" means a copolymer of tetrafluoroethylene/hexafluoropropylene (89.5/10.5) containing 55% solids and stabilized with octaphenoxy polyethylene oxide dispersing agent having an average of 10 ethylene oxide units and neutralized with ammonium hydroxide.

"Dispersion B" means a copolymer of tetrafluoroethylene/perfluoro propyl vinyl ether (97/3) containing 55% solids and stabilized with octaphenoxy polyethylene oxide dispersing agent having an average of 10 ethylene oxide units and neutralized with ammonium hydroxide.

The coating dispersions were prepared by adding water to the PTFE dispersion, and then adding the other ingredients. Amounts of ingredients of the coating dispersion are listed in each Example, as are % pickup of dried coating on glass fabric.

Six inch×six inch pieces of glass fabric were immersed in the coating dispersion and wrung partially dry through rollers. The fabric was then cured at 250° C. for ten minutes, unless otherwise noted. The percent pick-up was determined by weighing the fabric after heat cleaning and again after curing and drying.

Samples were tested for flex life in the warp direction using an MIT flex tester Model 2 (Tinius Olson Co). Strips ½-inch wide were used and fabric tension was supplied by a four or five pound weight. Samples were conditioned prior to testing as shown below. Five or six strips were tested at each condition listed as follows unless otherwise noted:

Condition

As made—samples were conditioned 24 hours at 72° F. and 50% RH for at least 24 hours prior to testing.

Acid treated—samples were heated four hours at 450° F. or 500° F. in an air circulating oven (unless they had been subjected to prior longer term heating). The samples were then immersed for five minutes in 1.0 N sulfuric acid maintained at 80° C. The samples were removed from the acid and dried five minutes at 450° F. The acid immersion was repeated for a total of 4 times. The fabric was then heated one hour at 450° F. or 500° F. and allowed to remain at 72° F., 50% RH prior to testing.

EXAMPLE 1

Six inch×six inch pieces of Burlington 484 fabric were heat cleaned by placing them in an air circulating oven at 350° C. for 10 minutes. The samples were dipped in the coating dispersions shown below, wrung dry and cured and dried 10 minutes at 250° C. Six fabric samples were coated with each formulation. Three samples were tested as made and three after acid treatment. Six ½" strips were tested from each piece giving a total of 18 strips per composition per conditioning method, using a five pound weight.

| Formu-lation | Coating Dispersion (gm) | | | | | % Pick-Up | Warp Flex Life | |
|---|---|---|---|---|---|---|---|---|
| | PTFE Disp. | H₂O | Sil-ane | Sil-ox-ane | Re-pel-lant | | As Made | Acid Treated (450° F.) |
| 1 | 100 | 289 | 3.6 | 3.6 | 3.6 | 10.7 | 10,000 | 4616 |
| A | 100 | 293 | 3.6 | 3.6 | — | 10.5 | 6817 | 930 |
| B | 100 | 293 | 3.6 | — | 3.6 | 10.6 | 11,795 | 1678 |

The results of these tests were analyzed using the Student's test to establish confidence leads on the relative ranking. The results showed that the composition containing Silane, Siloxane and Water Repellant had significantly better warp flex life after acid treatment than the other two compositions. The confidence level is greater than 99%.

EXAMPLE 2

The same procedure and fabric of Example 1 were used. Coating composition formulations and results are shown in the following tables.

| For-mu-la-tion | Composition (gm) | | | | | % Pick-Up |
|---|---|---|---|---|---|---|
| | PTFE Disp. | H₂O | Silane | Water Repel-lant | Siloxane | |
| A | 90 | 210 | — | — | — | 11.0 |
| B | 90 | 207 | 3.2 | — | — | 9.7 |
| C | 180 | 404 | 6.4 | — | 6.4 | 9.6 |
| 1 | 90 | 200 | 3.2 | 3.2 | 3.2 | 9.3 |
| D | 90 | 200 | 3.2 | 3.2 | — | 10.7 |

| Sample | Warp Flex Life (5 pound weight) | |
|---|---|---|
| | As Made | Acid Treated (450° F.) |
| A | 7146 | 1 |
| B | 4014 | 534 |
| C | 2755 | 1801 |
| 1 | 3045 | 2405 |
| D | 4438 | 973 |

Comparisons A, B, C and D did not exhibit as good flex life after acid treatment as Sample 1 which is a sample of this invention.

EXAMPLE 3

The procedure of Example 1 was followed except that the fabric employed was Clark Schwebel Style 6758 in which the sizing had been removed by heat cleaning. Coat composition formulations and results are shown in the following tables.

| Formu-lation | Composition (gm) | | | | | | |
|---|---|---|---|---|---|---|---|
| | PTFE Disp. | Disp. A | Disp. B | H₂O | Sil-ane | Sil-oxane | Water Repellant |
| 1 | — | 60 | — | 135 | 1.8 | 1.8 | 1.8 |
| 2 | 40 | 12 | 12 | 143 | 1.8 | 1.8 | 1.8 |
| 3 | — | — | 53 | 142 | 1.8 | 1.8 | 1.8 |
| 4 | 40 | — | 10.6 | 144 | 1.8 | 1.8 | 1.8 |
| 5 | 40 | — | 10.6 | 144 | 1.8 | 1.8 | 1.8 |
| 6 | 90.4 | — | — | 261 | 3.2 | 3.2 | 3.2 |

Dispersions A and B are melt-processible polymers. The coated fabric was cured for 10 minutes at the temperatures shown below and tested for warp flex life using a four pound weight.

| Formu-lation | Cure Temp (°F.) | Warp Flex Life | |
|---|---|---|---|
| | | As Made | Acid Treated (500° F.) |
| 1 | 250 | 3800 | 3400 |
| 2 | 280 | 50000 | 13000 |
| 3 | 250 | 2600 | 2900 |
| 4 | 250 | 24000 | 14700 |
| 5 | 310 | 35000 | 15600 |
| 6 | 250 | 23000 | 15300 |

Formulations 1 and 3 were cured below the melt temperature of the polymers in Dispersions A and B and thus have low warp flex life to begin with. Formulations 1 and 3 show good acid resistance after acid treatment even though the initial values are low. Formulations 2, 4, 5 and 6 show the advantage in employing PTFE along with the melt-processible polymers, as the warp flex life as made is improved several fold.

EXAMPLE 4

The procedure of Example 1 was followed except that the fabric employed was Clark Schwebel Style 6758 in which the sizing had been removed by heat cleaning and except that after dipping the coating dispersion, wringing dry, and cure-drying 10 minutes at 250° C., the coated fabric was dipped into a second dispersion containing only water repellant and then wrung dry and cured for 10 minutes at 250° C.

Coating composition formulations and results are shown in the following tables.

| Formulation | 1st Coating Composition (gm) | | | | Water Repellant |
|---|---|---|---|---|---|
| | PTFE Disp | H$_2$O | Silane | Siloxane | |
| 1 | 90.4 | 261 | 3.2 | 3.2 | 3.2 |
| 2 | 50 | 146 | 1.8 | 1.8 | — |
| 3 | 50 | 146 | 1.8 | 1.8 | — |
| 4 | 50 | 146 | 1.8 | 1.8 | — |

| Formulation | 2nd Coating Formulation (gm) | | % Pickup | |
|---|---|---|---|---|
| | Water Repellant | H$_2$O | 1st | 2nd |
| 1 | None | | 10 | — |
| 2 | 50 | 50 | 9.8 | 0.58 |
| 3 | 25 | 75 | 9.9 | 0.30 |
| 4 | 10 | 90 | 10.1 | 0.09 |

| Formulation | Warp Flex Life | |
|---|---|---|
| | As Made (4 pound Weight) | Acid Treated (500° F.) |
| 1 | 23000 | 15300 |
| 2 | 28000 | 45000 |
| 3 | 35000 | 31000 |
| 4 | 36000 | 26000 |

Formulation 1 did not undergo a second coating of the water-repellant and its as made warp flex life is seen to be the poorest of the four. Formulation 2 in which the second coating contained the most water-repellant of Formulations 2–4 is seen to have the best warp flex life after acid treatment.

We claim:

1. A coating dispersion which imparts resistance to attack by acidic flue gas to glass fabric coated with said dispersion, consisting essentially of
   (a) water,
   (b) 5–65% by weight tetrafluoroethylene polymer, said weight based on weight of water and polymer, said polymer being of film-forming molecular weight,
   (c) 2–60% by weight of a polyhydrolyzable silane of the formula R$_1$Si—(OR)$_3$ wherein R is lower alkyl, preferably alkyl of 1–3 carbon atoms, and R$_1$ is phenyl or substituted lower alkyl, preferably of 1–3 carbon atoms, in which the substituents are selected from halogen, quaternary ammonium, or —NR'R" in which R' and R" are each H, lower alkyl, lower alkoxyalkyl, amino lower alkyl, hydroxyl lower alkyl, or substituted amino lower alkyl, said weight based on weight of tetrafluoroethylene polymer,
   (d) 1–20% by weight of a hydrocarbyl siloxane, said weight based on weight of tetrafluoroethylene polymer,
   (e) 1–20% by weight of a polymer of a fluorinated ester of an acrylic acid, said weight based on weight of tetrafluoroethylene polymer.

2. The coating dispersion of claim 1 wherein the tetrafluoroethylene polymer is polytetrafluoroethylene.

3. The coating dispersion of claim 2 wherein the silane has the formula R$_1$Si(OR)$_3$ wherein R is —CH$_3$ or —C$_2$H$_5$ and R$_1$ is substituted lower alkyl in which the substituent is in the γ position and is an amino- or amino-substituted group.

4. The coating dispersion of claim 3 wherein the silane is γ-aminopropyl triethoxy silane.

5. The coating dispersion of claim 3 wherein the silane is γ-aminopropyl trimethoxy silane.

6. The coating dispersion of claim 3 wherein the siloxane is an alkyl or alkyl/phenyl siloxane.

7. Glass fabric coated with the dispersion of claim 1, 2, 3, 4, 5 or 6, said coating being unsintered.

* * * * *